(12) United States Patent
Dugand

(10) Patent No.: US 6,797,201 B2
(45) Date of Patent: Sep. 28, 2004

(54) MULTICOLOR GELATIN RIBBONS AND MANUFACTURE OF SOFT GELATIN PRODUCTS

(75) Inventor: Juan Pablo Manotas Dugand, Barranquilla (CO)

(73) Assignee: Procaps S.A., Barranquilla (CO)

( * ) Notice: Subject to any disclaimer, the term of this patent is extended or adjusted under 35 U.S.C. 154(b) by 338 days.

(21) Appl. No.: 10/124,306

(22) Filed: Apr. 18, 2002

(65) Prior Publication Data

US 2002/0153626 A1 Oct. 24, 2002

Related U.S. Application Data

(60) Provisional application No. 60/284,923, filed on Apr. 20, 2001.

(51) Int. Cl.$^7$ .................... B29C 39/10; B29C 39/12; A21C 11/00; B05D 1/36
(52) U.S. Cl. .................... 264/4; 264/245; 425/130; 427/258
(58) Field of Search .................... 264/4, 245; 425/130, 425/258

(56) References Cited

U.S. PATENT DOCUMENTS 6,569,363 B1 * 5/2003 Schurig et al. .............. 264/4

* cited by examiner

Primary Examiner—Stephen J. Lechert, Jr.
(74) Attorney, Agent, or Firm—Isaac A. Angres

(57) ABSTRACT

The invention provides a new method and apparatus for making multicolor gelatin ribbons and softgel capsules is provided which uses a modification of the gelatin spreader boxes by incorporating especially designed pipelines that are bifurcated with a tee. The present invention also relates to an apparatus for providing decorative coloring effects such as stripes of desired colors on softgel gelatin products comprising: (a) a second gelatin spreader box, with four sides and a bottom, that can be mounted on the outside of a first gelatin spreader box in any convenient manner; (b) at least one orifice in the second spreader box for the dispensing of decorative gelatin; (c) means to adjust the size of said at least one orifice; (d) a main conduit, with at least one opening within said spreader box, providing passage for said decorative gelatin into said box; an into at least one orifice (e) a means to couple said main conduit with said an external source of decorative gelatin; and (f) a means to maintain the temperature of said decorative gelatin within a desired range of temperature; wherein said at least one orifice is constructed to dispense said decorative gelatin onto a base gelatin flowing from said first gelatin spreader box onto a casting drum surface.

41 Claims, 3 Drawing Sheets

MULTICOLOR GELATIN RIBBONS AND MANUFACTURE OF SOFT GELATIN PRODUCTS

This application claims priority from U.S. provisional application No. 60/284,923 filed Apr. 20, 2001.

FIELD OF THE INVENTION

The present invention relates generally to softgel capsules having decorative and unusual color patterns and to the method and apparatus for manufacturing the same. The instant invention further relates to a paint ball comprising a gelatin capsule defining a closed interior chamber, and a fill material contained within said interior chamber, wherein said fill material incorporates a dye. The invention also relates to gelatin based textured paint balls and to a process and apparatus for the manufacture thereof. This invention further relates to the marbleization of materials, and more particularly, to the marbleization of soft gelatin capsules.

More specifically, the instant invention further provides a method and apparatus for manufacturing paint balls having unusual coloring patterns.

The invention further relates to fragile projectiles and methods for forming the same which are typically fired by compressed gas and which have an outer shell that fractures in a predetermined pattern to disperse paint contained therein.

The invention also provides a gelatin ribbon having special decorative colored effects formed according to the present inventive process. Alternatively, the instant invention also provides two decorative colored soft gelatin ribbons to form a completely patterned soft gelatin capsule, the patterns on each half either being the same or different. A limitless number of variations in the decorative patterns of soft gelatin capsules may be achieved by the process of the present invention. Furthermore, the method of the instant invention is easy to use, convenient, does not require elaborate apparatus above and beyond that required for the conventional rotary die process. Many new and unique decorative patterns for soft gelatin capsules can be made by the process of the present invention.

Additionally, this invention relates to processes for making novel target shooting capsules having special decorative effects and having a relatively small diameter, and made from nontoxic, soft elastic gelatin capsule.

BACKGROUND OF THE INVENTION AND DESCRIPTION OF THE PRIOR ART

The use of soft gelatin capsules for marking trees with a marking fluid has been disclosed in U.S. Pat. No. 3,861,943. According to the '943 patent, the gelatin capsule has a wall thickness from 0.02 inches to 0.03 inches and a diameter of about 0.25 inches to 0.75 inches. The capsule contains from 0.25 cc to 1.25 cc of marking fluid, generally a pigmented liquid such as paint, lacquer or the like, and is useful for marking trees. However, the marking capsule of the '943 patent has deficiencies in other applications such as target shooting. In particular, the amount and type of fluid in the capsule create difficulties for use in target shooting. A key problem is caused by the fact that the shape of the capsule is based on the amount of fluid contained therein. As a result, the capsule is not suitable for target shooting as it is not spherically shaped. Furthermore, the amount and type of marking fluid creates a very large splatter mark, around two inches in diameter which is suitable for trees but useless for competitive target shooting. Another problem is that due to the make up of these capsules conventional air guns must be modified to fire the same.

U.S. Pat. Nos. 5,672,300 and 6,022,499 teach an apparatus for forming patterned soft gelatin capsules including a first spreader box and a second spreader box disposed therein, with the first box holding a first dispensable flowable gelatin mass and the second spreader box holding a second dispensable flowable gelatin mass with the second gelatin mass being of a type that is visually distinct from the first gelatin mass. The first gelatin mass is dispensed through an opening formed between an outer surface of the second spreader box and an inner surface of the first spreader box to form a ribbon whereat the second gelatin mass is dispensed from an opening in the second box to flow onto the ribbon to form the patterned gelatin ribbon. Thereafter the capsules are formed by introducing a fill between a pair of patterned ribbons being conveyed on a pair of rollers.

U.S. Pat. No. 5,246,635 describes a process for the manufacture of textured softgel capsules, by controllably directing a flowable gelatin mass onto the outer surface of a drum, to form a ribbon of substantially uniform thickness thereon and thereafter passing the ribbon between a roller of reduced diameter with a textured surface and the drum surface while applying sufficient pressure to the roller to cause the textured surface to impart a matching texture on the surface of the ribbon, providing a second gelatin ribbon, forming a plurality of filled capsules from the gelatin ribbons with the matching texture defining the outer surface of at least a portion of each of the capsules.

It is also well known to use paint balls in the sport called "War Games" wherein two or more opposing teams are equipped with gas powered guns shooting paint balls at each other. When the paint ball strikes an opponent, the paint ball shatters and releases the fill material or "paint" onto the player. In doing so, the player who has been struck by the paint ball is marked and eliminated from the game. The game terminates when only one or more members of the same team have not been marked.

Currently, paint balls in the market place are of a single color. Thereby leaving a market for paint balls with a more striking decorative appearance. Accordingly, the present invention provides a method and apparatus for making gelatin based paint balls and capsules having unusual coloring which will be eye catching thereby increasing interest and sales.

The prior art is replete with methods to produce color and patterns in cast materials to simulate the natural look of marble like products. However, in most instances there is little or no control over the pattern or its reproducibility. Furthermore, few, if any, of the prior art methods are readily adaptable to automation for consistent production of matching articles.

The line marking in the gelatin ribbon of the present invention, is achieved by modifying the gelatin spreader boxes. With the help of specially designed pipelines, a different color gelatin is charged into a spreader box through a series of conduits, thus creating an interlinear design in the newly formed gelatin ribbon when the same is dispensed thereon. When a pair of ribbons are filled with paint, dye or the like, the color lines grow wider creating a degradation thereof resulting in an attractive appearance.

OBJECTS OF THE INVENTION

Figure 1:
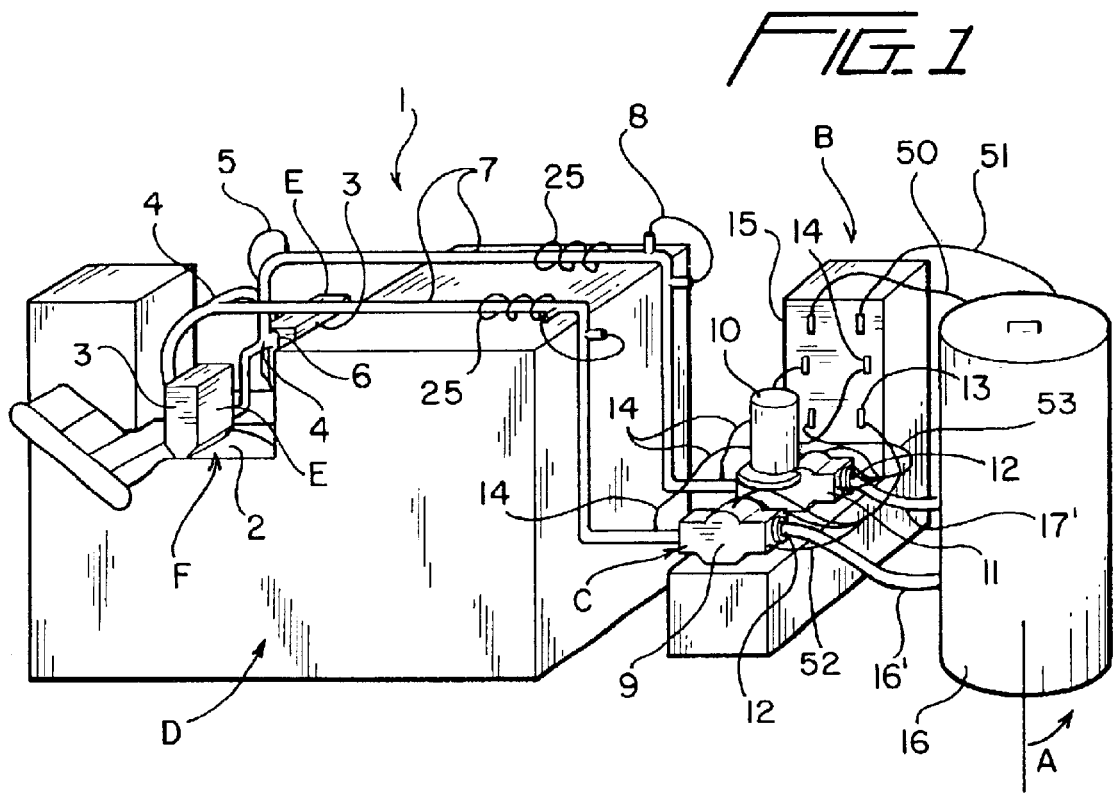
FIG. 1 is a view of the apparatus used to achieve striated lines on gelatin ribbons.

It is an object of the present invention to provide a convenient, easy to use apparatus and method of using the same for forming ribbons used in the making of soft gelatin capsules with decorative features.

It is a specific object of the present invention to provide an apparatus for producing a gelatin ribbon having special decorative effects that is in turn useful for forming soft gelatin capsules paint balls, etc. having special decorative patterns. The inventive apparatus includes a modification of known gelatin spreading boxes by incorporating at least one additional box thereto and introducing a different gelatin mass therein by means of specially designed pipelines.

Other objects and embodiments of the present invention will be discussed below. However, it is important to note that many additional embodiments of the present invention not described in this specification may nevertheless fall within the spirit and scope of the present invention and/or the claims.

SUMMARY OF THE INVENTION

The present invention relates to an apparatus for providing decorative coloring effects such as stripes of desired colors on softgel gelatin products comprising: (a) a second gelatin spreader box, with four sides and a bottom, that can be mounted on the outside of a first gelatin spreader box in any convenient manner; (b) at least one orifice in the second spreader box for the dispensing of decorative gelatin; (c) means to adjust the size of said at least one orifice; (d) a main conduit, with at least one opening within said spreader box, providing passage for said decorative gelatin into said box; an into at least one orifice (e) a means to couple said main conduit with said an external source of decorative gelatin; and (f) a means to maintain the temperature of said decorative gelatin within a desired range of temperature; wherein said at least one orifice is constructed to dispense said decorative gelatin onto a base gelatin flowing from said first gelatin spreader box onto a casting drum surface.

The present invention also provides a method for the production of striated ribbon used in the production of soft gel products by using the apparatus described in the above paragraph.

The invention is also directed to a dispensing system including a first box for receiving and storing gelatin of one color, said first box having an unobstructed discharge opening at the bottom thereof for spreading a layer of said one color gelatin, a second box receiving, storing and dispensing a gelatin of a second color, said second box having a plurality of spaced discharge openings extending across a width thereof whereby a plurality of spaced second color lines are dispensed onto said first color layer thereby forming a striped ribbon.

The invention further provides a method of forming a striped gelatinous ribbon including the steps of discharging material and forming a layer of one color, and discharging a second material of a different color into a series of spaced lines onto said layer.

In a further embodiment the invention also provides an apparatus for providing decorative coloring effects such as stripes of desired colors on softgel gelatin products comprising: (a) a second gelatin spreader box gate, with four sides and a bottom, mounted on the outside of a main gelatin spreader box and containing a decorative gelatin; (b) means for coupling said second box to a main spreader box containing a base gelatin; (c) at least one orifice in said second gelatin spreader box for dispersion of said decorative gelatin; (d) means to adjust the size of said at least one orifice; (e) a main conduit, with at least one opening within said second gelatin box, providing passage for said decorative gelatin therein; (f) said main conduit, coupled with said at least one orifice; (g) a means to couple said main conduit with at least one external source of decorative gelatin; and (h) a means to maintain the temperature of said decorative gelatin within a desired range of temperature; wherein said at least one orifice is constructed to dispense said decorative gelatin onto a base gelatin flowing from said main gelatin spreader box disposed on casting drum surface.

The invention also provides a system for the production of softgel products having decorative colored patterns comprising at least one box gate apparatus comprising: (a) a second gelatin spreader box, with four sides and a bottom, that can be mounted on the outside of a main gelatin spreader box and containing a decorative gelatin; (b) means for coupling said second box to a main spreader box; (c) at least one orifice in said second gelatin spreader box for dispersion of said decorative gelatin; (d) means to adjust the size of said at least one orifice; (e) a main conduit, with at least one opening within said second gelatin box, providing passage for said decorative gelatin therein; (f) said main conduit, coupled with said at least one orifice; (g) a means to couple said main conduit with at least one external source of decorative gelatin; (h) a casting drum with a surface; (i) a means to maintain the temperature of said decorative gelatin within a desired range of temperature; wherein said at least one orifice is constructed to dispense said decorative gelatin onto a base gelatin flowing from said main gelatin spreader box disposed on casting drum surface.

A method to produce gelatin products of a base color with decorative differently colored patterns comprising the use of a box gate apparatus to flow decorative colored gelatin patterns into contact with a base gelatin ribbon wherein said box gate apparatus comprises: (a) a gelatin spreader box gate, with four sides and a bottom, that can be mounted on the outside of a gelatin spreader box; (b) a means for coupling said box gate to said spreader box; (c) at least one orifice for the release of said decorative gelatin; (d) means to adjust the size of said at least one orifice; (e) a main conduit, with at least one opening within said box gate, providing passage for said decorative gelatin into said box gate; (f) at least one injection site, in said main conduit, coupled with at least one external source of said decorative gelatin; (g) a means to couple said at least one injection site of said main conduit with said at least one external source of said decorative gelatin; (h) at least one connector tube to provide passage for said decorative gelatin from said at least one opening of said main conduit to said at least one orifice; and (i) a means to maintain the temperature of said decorative gelatin within a desired range of temperature; wherein said at least one orifice is constructed to release said decorative gelatin to contact with a mass of base gelatin flowing from said gelatin spreader box onto the surface of a casting drum.

DETAILED DESCRIPTION OF THE INVENTION

The present invention provides soft elastic gelatin capsules, paint balls, etc. having novel decorative effects such as color stripes which are useful as a substitute for standard lead or steel pellets used in recreational target shooting with small caliber air powered rifles and handguns. The capsules, paint balls, etc. burst on impact thereby allowing for the reuse of targets as no damage is done to the same as in the case of steel pellets. As there is no ricocheting, safety is increased in recreational areas. The capsule is produced by a novel apparatus and process with completely nontoxic materials, and will cause no chemical harm if accidentally ingested.

With reference to FIG. 1, the apparatus of the present invention is designated generally as 1 and is seen to include gelatin tanks A, a temperature control module B, pumping means C, a support member D, spreader boxes E, E and a casting drum F, partially shown, and piping interconnecting the tanks, pumps and spreader boxes.

As seen tanks 16, 17, usually made of stainless steel, are filled with different types of gelatin and are connected to temperature module 15 via lines 50, 51 for controlling the temperature. The gelatin is caused to flow through pipelines 16, 17, generally made of plastic, having a diameter of one or two inches, by pumps 9 and 11, respectively. The pumps have heating elements and temperature sensors, 12, 12 to keep the pumps at a constant and sufficient temperature to maintain the gelatin in its fluid state. The sensor and the heaters 12, 12 are electrically connected to a module 15 by lines 52, 53.

The pumps 9 and 11 are motor driven and each have a flow-regulating valve and vent (not shown in the drawings) to extract the air trapped inside the pipeline when the machine is started up.

The two different gelatins pass out of the pump 9,11, respectively, into stainless steel pipelines 7, 7 having a diameter of one or two inches. The pipelines 7, 7 are covered with a heating element 25 of ferrous tin coated with a fiber-glass shield and are connected to module 15 by lines 14,14. The entire pipeline is lined (not shown) with a thermo-shrinkable material. The pipelines 7, 7 include unions in their make up and have connectors 8, 8 to connect one heater to the other. These resistance heaters 25, 25 are successively connected to the modules by means of cables and connectors 14, 14. Each pipeline 7, 7 bifurcates in a tee 4, 4, respectively, thereby introducing their gelatin into each of the spreader boxes 3, 3 causing each to be filled with two different types of gelatin. The spreader boxes 3, 3 are also equipped with electrical resistance heating elements, and a temperature sensor, not shown in the drawings.

Figure 2:
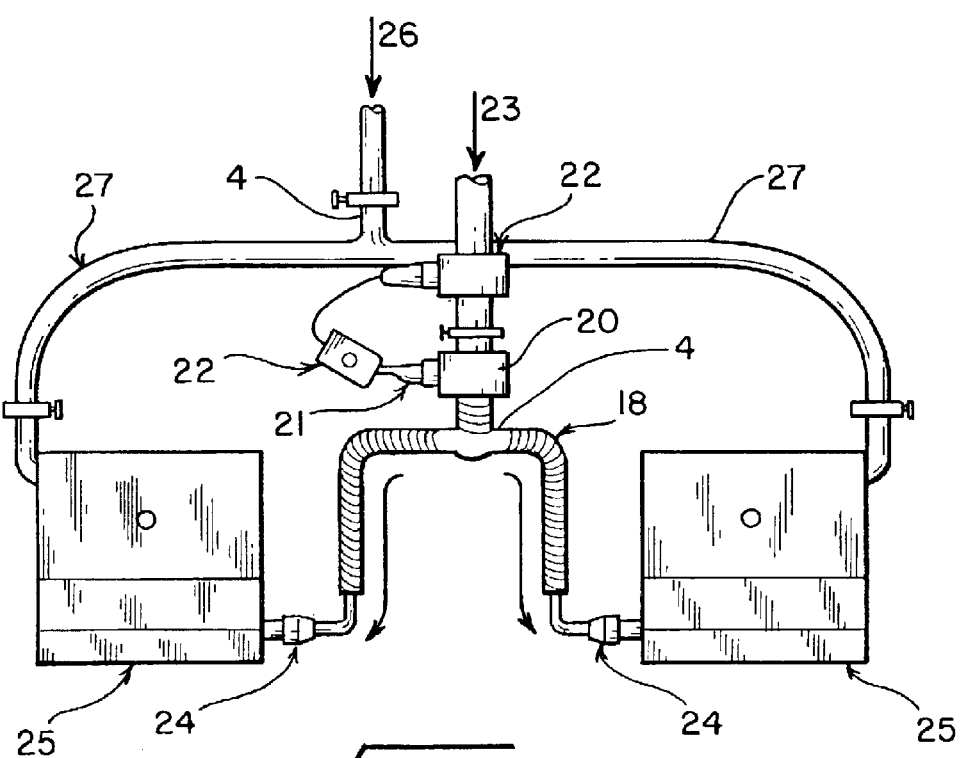
FIG. 2 shows the two gelatin feeds to spreader boxes.

FIG. 2 illustrates how each gelatin color is separately introduced into the spreader boxes 25, 25. The gelatin that is going to be used as the base or ribbon exits through line 26 into the tee 4 where it is divided into feed lines 27, 27 going to each of the boxes 25, 25. The gelatin that is to be used for line marking or decorative or patterned effect passes through the line gelatin 23 into tee 4 where it is divided into feed lines 18, 18, couplings 24, 24 and into boxes 25, 25.

These pipelines 18, 18 are wrapped with the same type of heating element as described for the above mentioned pipelines and includes a dimmer 22 to regulate the current supplied to the resistance heating element in order to avoid overheating that may cause damage to the plastic pipelines, or otherwise harden the gelatin, thus obstructing, or clogging the system. This system takes the electrical energy from the already described gelatin pipeline itself, through connectors and cables 20 and 21.

Figure 3:
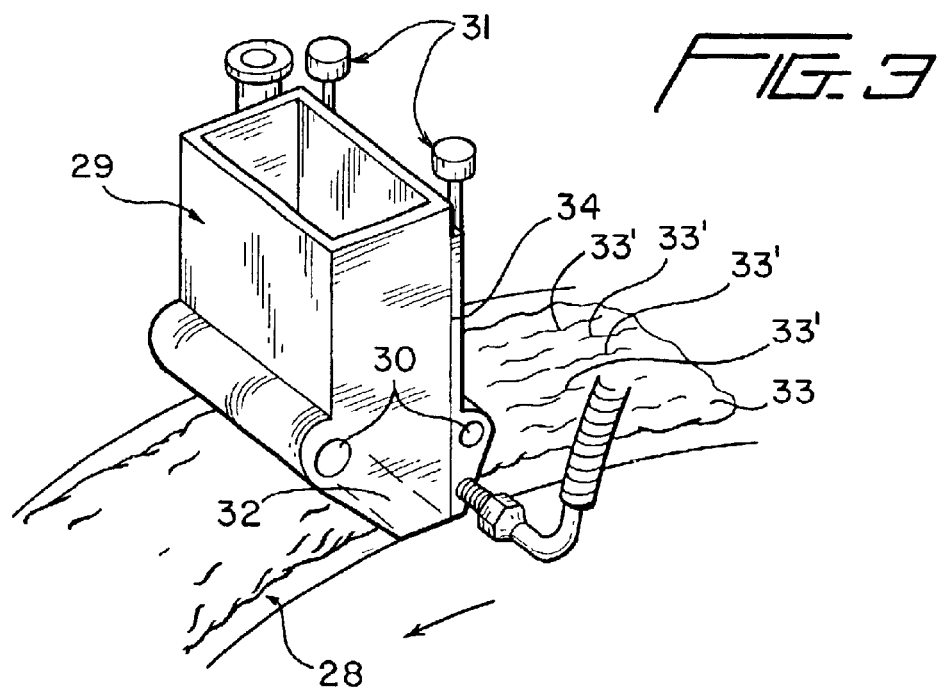
FIG. 3 shows the striated ribbon formed by the apparatus.
Figure 4:
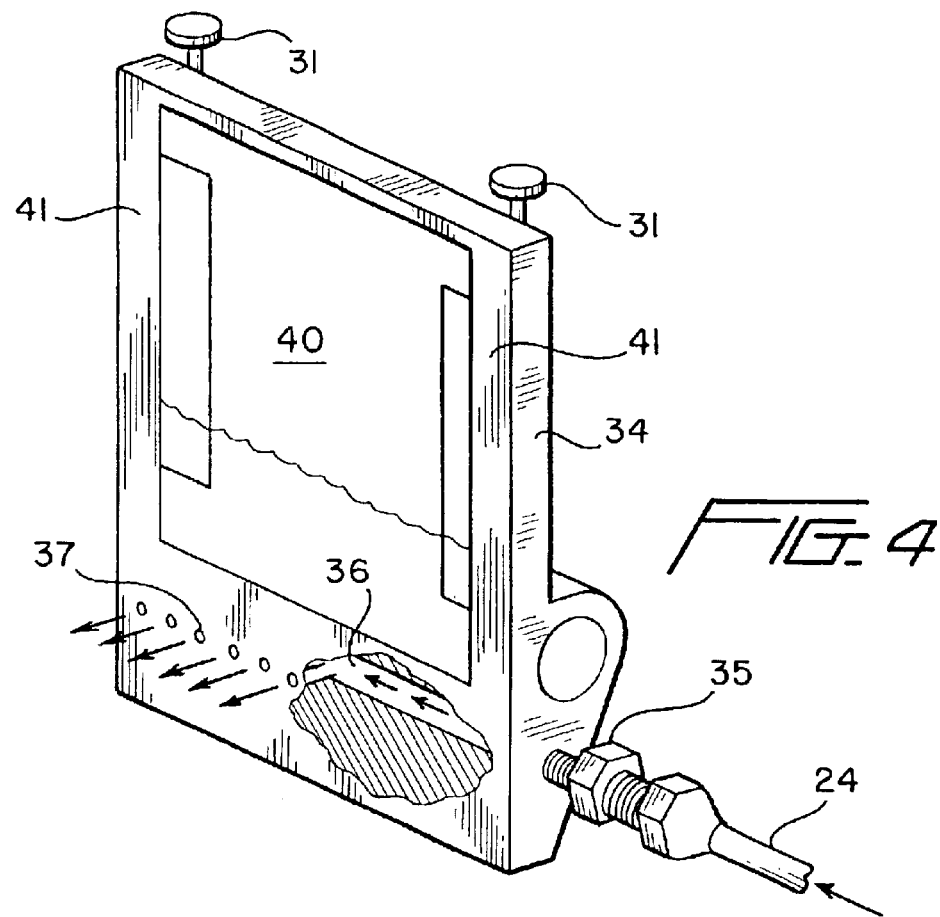
FIG. 4 shows the details of the second spreader box including the orifices which the second gelatin color is dispensed.

FIG. 3 shows the main gelatin spreader box 29 and the second gelatin spreader box 34 mounted on the rear thereof disposed over a rotating casting drum 28 with gelatin from the main spreader box 34 being dispensed through an opening 32 extending the substantial length of the box 29 to form a continuous ribbon 33 on the drum 28 as the same rotates. The different colored gelatin of spreader box 34 is discharged through spaced orifices 37, as seen in FIG. 4 onto the ribbon 33 forming spaced lines 33', 33' etc.

The spreader box 34 can be mounted on box 29 by any suitable means and includes an adjustable plate 40 associated therewith for regulating the flow of gelatin through the openings 37, 37 by adjusting the size thereof. The plate 40 is constrained in flanges 41, 41 for up and downward movement, the movement of which is regulated by knobs 31,31.

Figure 5:
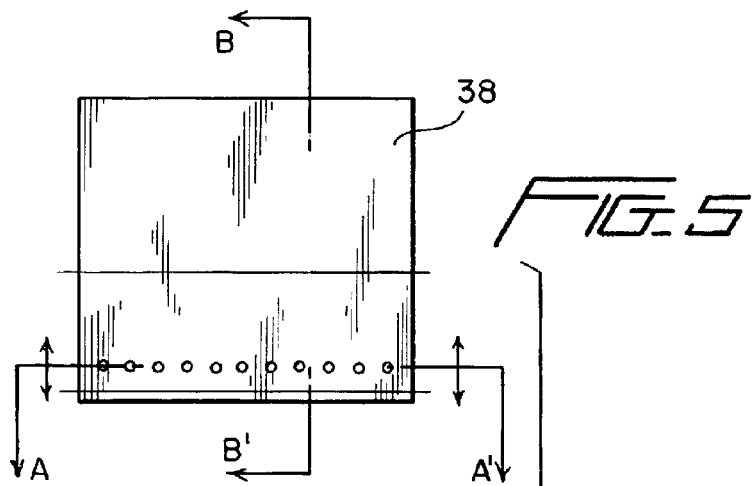
FIG. 5 shows a ribbon depicting various shapes and patterns which can be applied to ribbons.
Figure 6A:
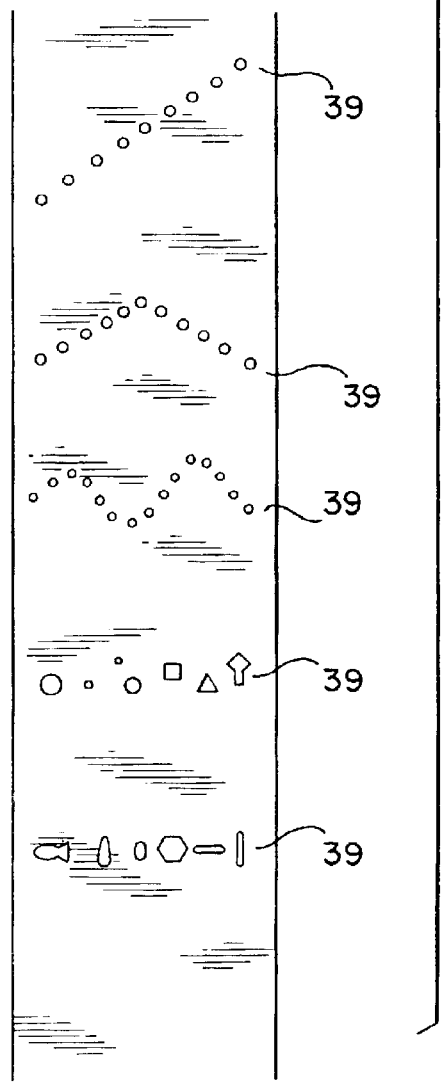
FIGS. 6A and 6B show a gelatin spreader box detailing two different views and various possible placing for the injecting orifices.
Figure 6A:
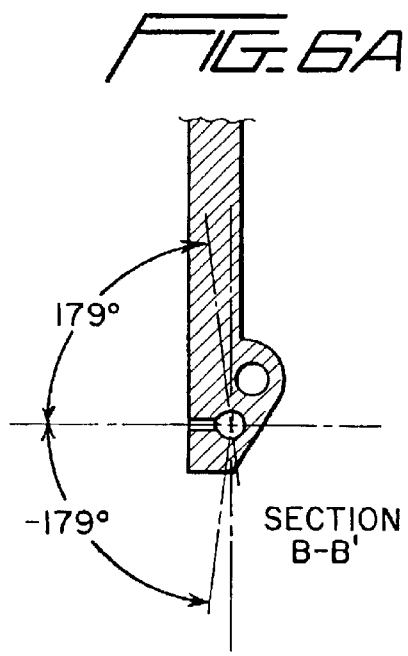
Figure 6B:
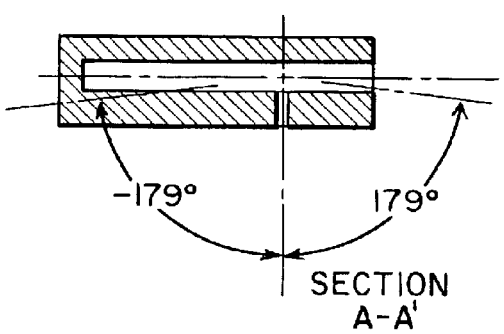

Orifices 37 can have any of the symmetrical or asymmetrical geometrical shapes as shown in FIG. 5, element 39. Their size can vary from 1/64 inch to 1/2 inch to a height extending from 1/64 inch to 3 inches, measured from the bottom of the orifices, and with a width from 1/32 inch to 3 inches. Orifices 37 are in communication with a main feeder orifice 36 fed from inlet 24 whose dimension can vary from 1/64 inch to 2 inches in an angle going from −89° to 89° as shown in FIGS. 6A, 6B, elements 40 and 41.

The gelatin is introduced into the main conduit 36 at any point alongside the exterior face of the box 3, and if desired it can have one or more introduction points.

During the development of this invention, a great variety of colorful effects have been achieved on the gelatin ribbon when changing the position, the geometry, the shape, the amount of orifices, and the inclination angles of the orifices 37 as well as the injected gelatin flow.

The instant application shows a detailed description of particular embodiments of the invention as described above. It is understood that all equivalent features are intended to be included within the claimed contents of this invention.

Although the present invention has been described with reference to specific details of certain embodiments thereof, it is not intended that such detail should be regarded as limitations upon the scope of the invention, except as and to the extent that they are included in the accompanying claims.

What is being claimed is:

1. A dispensing system including a first box for receiving and storing gelatin of one color, said first box having an unobstructed discharge opening at the bottom thereof for spreading a layer of said one color gelatin, a second box mounted on the rear of said first box for receiving, storing and dispensing a gelatin of a second color, said second box having a plurality of spaced discharge openings extending across a width thereof whereby a plurality of spaced second color lines are dispensed onto said first color layer thereby forming a striped ribbon.

2. The dispensing system of claim 1 wherein the second box has means for securing the same to said first box with said spaced discharge openings disposed above and away from said unobstructed discharge opening thereby dispensing a plurality of spaced lines onto said layer.

3. The dispensing system of claim 2 wherein said first and second boxes have means for introducing different colored gelatin therein.

4. The dispensing system of claim 3 wherein said first layer is discharged onto a casting drum.

5. The dispensing system of claim 2 wherein said plurality of spaced openings are formed of common shapes and sizes.

6. The dispensing system of claim 3 wherein a common passageway communicates with said plurality of spaced openings for introducing said second color gelatin therein.

7. The dispensing system of claim 3 wherein said first and second boxes each have additional openings and a cartridge heater disposed in each thereof.

8. The dispensing system of claim 3 wherein said plurality of spaced openings are slanted downward to facilitate the discharge of gelatin thereout.

9. A method of forming a striped gelatinous ribbon including the steps of discharging material and forming a layer of one color, and discharging a second material of a different color into a series of spaced lines onto said layer wherein said layer is formed by providing a box for receiving and storing said material and dispensing material from the bottom thereof, and wherein said series of spaced lines are formed by providing a second box mounted on said first box with a plurality of spaced openings and discharging material therethrough onto said layer.

10. The method of claim 9 wherein said layer is formed by providing a box for receiving and storing said material and dispensing material from the bottom thereof, and wherein said series of spaced lines are formed by providing a second box with a plurality of spaced openings and discharging material therethrough onto said layer.

11. The method of claim 10 further securing said second box onto said first box and disposing the spaced openings above said bottom opening of said first box.

12. The method of claim 11 and further providing material-introducing means into said first and second boxes.

13. The method of claim 12 and further providing a casting roller for receiving said layer.

14. An apparatus for providing decorative coloring effects such as stripes of desired colors on softgel gelatin products comprising:
 (a) a second gelatin spreader box gate, with four sides and a bottom, mounted on the outside of a main gelatin spreader box and containing a decorative gelatin;
 (b) means for coupling said second box to a main spreader box containing a base gelatin;
 (c) at least one orifice in said second gelatin spreader box for dispersion of said decorative gelatin;
 (d) means to adjust the size of said at least one orifice;
 (e) a main conduit, with at least one opening within said second gelatin box, providing passage for said decorative gelatin therein;
 (f) said main conduit, coupled with said at least one orifice;
 (g) a means to couple said main conduit with at least one external source of decorative gelatin; and
 (h) a means to maintain the temperature of said decorative gelatin within a desired range of temperature;
  wherein said at least one orifice is constructed to dispense said decorative gelatin onto a base gelatin flowing from said main gelatin spreader box disposed on casting drum surface.

15. An apparatus as described in claim 14 wherein said at least one orifice is of any geometrical form and size.

16. An apparatus as described in claim 15 wherein said at least one orifice has a span of up to three inches.

17. An apparatus as described in claim 14 wherein said means to adjust the size of said at least one orifice is a gate lifting system.

18. An apparatus as described in claim 14 wherein said at least one opening has a span of up to two inches in any non-horizontal direction possible.

19. An apparatus as described in claim 14 wherein said at least one external source of decorative gelatin is in communication with said second gelatin spreader box that releases said decorative gelatin by a pipeline that is coupled to said main conduit at said injection site external to said second box.

20. An apparatus as described in claim 14 wherein said softgel products are capsules.

21. An apparatus as described in claim 14 wherein said softgel products are ribbons.

22. A system for the production of softgel products having decorative colored patterns comprising at least one box gate apparatus comprising:
 (a) a second gelatin spreader box, with four sides and a bottom, mounted on the outside of a main gelatin spreader box and containing a decorative gelatin;
 (b) means for coupling said second box to a main spreader box;
 (c) at least one orifice in said second gelatin spreader box for dispersion of said decorative gelatin;
 (d) means to adjust the size of said at least one orifice;
 (e) a main conduit, with at least one opening within said second gelatin box, providing passage for said decorative gelatin therein;
 (f) said main conduit, coupled with said at least one orifice;
 (g) a means to couple said main conduit with at least one external source of decorative gelatin;
 (h) a casting drum with a surface;
 (i) a means to maintain the temperature of said decorative gelatin within a desired range of temperature;
  wherein said at least one orifice is constructed to dispense said decorative gelatin onto a base gelatin flowing from said main gelatin spreader box disposed on casting drum surface.

23. A system as described in claim 22 that further includes
 a. gelatin;
 b. at least one gelatin tank with at least one inlet, at least one outlet, and a means for maintaining temperature control;
 c. a source of said base gelatin that is of a desired base color;
 d. at least one source of said decorative gelatin that is of at least one different color;
 e. optional additional spreader boxes; and
 f. pipelines for the distribution of said gelatin.

24. A system as described in claim 23 that further includes means to open and close said at least one outlet and said at least one inlet wherein said at least one gelatin tank is a tightly sealed tank when all of said at least one inlet and said at least one outlet are closed.

25. A system as described in claim 23 wherein said at least one gelatin tank is made of stainless steel.

26. A system as described in claim 22 that further comprises a means for supplying said gelatin from said at least one gelatin tank to flow through said pipelines.

27. A system as described in claim 26 wherein said means for supplying said gelatin is a pump.

28. A system as described in claim 27 wherein said pump comprises a 0.75 kw motor-reductor 10 capable of working at constant speed, two heating elements, and a temperature sensor.

29. A system as described in claim 26 wherein said means for supplying said gelatin is two or more pumps.

30. A system as described in claim 26 wherein said means for supplying said gelatin is gravity.

31. A system as described in claim 26 wherein said means for supplying said gelatin is injection under pressure in said tightly sealed tank.

32. A system as described in claim 26 wherein said surface of said casting drum is kept at a lower temperature than said gelatin.

33. A system as described in claim 32 that further comprises lubricating rollers, a heated wedge, and a rotating die.

34. A system as described in claim 27 that further comprises a means to extract air trapped inside said pipelines.

35. A system as described in claim 34 wherein said means to extract air is a flow regulating valve in said pump.

36. A system as described in claim 22 wherein said pipelines are stainless steel with a diameter of about one to two inches, are covered with a heating element, and are lined with a thermo-shrinkable material.

37. A system as described in claim 36 wherein said heating element is of ferrous tin coated with a fiberglass shield.

38. A system as described in claim 22 wherein said means for coupling said box gate to said spreader box comprises male and female couplings.

39. A method to produce gelatin products of a base color with decorative differently colored patterns comprising the use of a box gate apparatus to flow decorative colored gelatin patterns into contact with a base gelatin ribbon wherein said box gate apparatus comprises:

(a) a gelatin spreader box gate, with four sides and a bottom, mounted on the outside of a gelatin spreader box;

(b) a means for coupling said box gate to said spreader box;

(c) at least one orifice for the release of said decorative gelatin;

(d) means to adjust the size of said at least one orifice;

(e) a main conduit, with at least one opening within said box gate, providing passage for said decorative gelatin into said box gate;

(f) at least one injection site, in said main conduit, coupled with at least one external source of said decorative gelatin;

(g) a means to couple said at least one injection site of said main conduit with said at least one external source of said decorative gelatin;

(h) at least one connector tube to provide passage for said decorative gelatin from said at least one opening of said main conduit to said at least one orifice; and (i) a means to maintain the temperature of said decorative gelatin within a desired range of temperature;

wherein said at least one orifice is constructed to release said decorative gelatin to contact with a mass of base gelatin flowing from said gelatin spreader box onto the surface of a casting drum.

40. A method as described in claim 39 that further comprises the steps of:

a. providing at least two colored gelatins;

b. putting each colored gelatin of said at least two colored gelatins into a corresponding gelatin receptacle dedicated for said each colored gelatin;

c. maintaining gelatin temperature control as needed;

d. supplying the first of said at least two colored gelatins to said spreader box as said base gelatin;

e. supplying at least one of the others of said at least two colored gelatins to said box gate as said decorative gelatin;

f. flowing said base gelatin out of the bottom of said spreader box onto said surface of said casting drum that has a lower temperature than said base gelatin;

g. simultaneously flowing said decorative gelatin through said at least one orifice in said box gate into contact with said base gelatin flowing toward said casting drum;

h. rotating said casting drum during the production of said gelatin products;

i. allowing said decorative gelatin to partially mix with said base gelatin; and j. allowing said rotating casting drum to drag a portion of said base gelatin with decorative gelatin to said surface of said casting drum to form a solidified gelatin ribbon of a base color with a decorative pattern of at least one other color.

41. A method as described in claim 40 that further comprises the steps of:

a. passing said gelatin ribbon through a set of lubricating rollers;

b. impregnating said gelatin ribbon with mineral oil as said gelatin ribbon passes through said lubricating rollers;

c. sliding said gelatin ribbon over the surface of said heated wedge to partially melt said gelatin ribbon;

d. optionally injecting a filler material for gelatin capsules into the cavities of a rotating die roller in which said gelatin ribbon is formed into gelatin capsules of one color with said decorative pattern of at least one other color.

* * * * *